(12) United States Patent  
Barua et al.

(10) Patent No.: US 10,884,903 B1  
(45) Date of Patent: Jan. 5, 2021

(54) AUTOMATIC PRODUCTION TESTING AND VALIDATION

(71) Applicant: INTUIT INC., Mountain View, CA (US)

(72) Inventors: Trilokesh Barua, Karnataka (IN); Linu Mathew Koshy, Karnataka (IN); Samarinder Singh Thind, Karnataka (IN); Anandhi Krishnaswamy, Karnataka (IN); Deepak Yadav, Karnataka (IN); Suhas S, Karnataka (IN); Arijit Chatterjee, Karnataka (IN); Deepashri Nataraj, Karnataka (IN); Akila Subramanian, Karnataka (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/177,467

(22) Filed: Nov. 1, 2018

(51) Int. Cl.
*G06F 9/44* (2018.01)
*G06F 11/36* (2006.01)
*G06F 8/71* (2018.01)
*G06N 20/00* (2019.01)

(52) U.S. Cl.
CPC .......... *G06F 11/3664* (2013.01); *G06F 8/71* (2013.01); *G06F 11/3608* (2013.01); *G06F 11/3612* (2013.01); *G06N 20/00* (2019.01)

(58) Field of Classification Search
CPC ............. G06F 11/3664; G06F 11/3668; G06F 11/3457; G06F 11/3476; G06F 9/455
See application file for complete search history.

(56) References Cited

U.S. PATENT DOCUMENTS

| | | | |
|---|---|---|---|
| 8,001,422 B1* | 8/2011 | Sun | G06F 11/263 714/25 |
| 9,558,106 B1* | 1/2017 | Moniz | G06F 11/3692 |
| 2008/0295088 A1* | 11/2008 | Bhat | G06F 8/656 717/170 |
| 2009/0282036 A1* | 11/2009 | Fedtke | G06F 21/6254 |
| 2010/0162050 A1* | 6/2010 | Cathro | G06F 11/3476 714/44 |
| 2013/0339931 A1* | 12/2013 | Rode | G06F 11/3664 717/128 |
| 2017/0277374 A1* | 9/2017 | Ozcan | G06F 40/197 |
| 2017/0286272 A1* | 10/2017 | Yang | G06F 11/3664 |
| 2017/0286273 A1* | 10/2017 | Lau | G06F 11/3664 |
| 2018/0285691 A1* | 10/2018 | Grindstaff | G06K 9/6262 |
| 2019/0138190 A1* | 5/2019 | Beaver | G06F 40/35 |
| 2020/0112487 A1* | 4/2020 | Inamdar | H04L 67/22 |

* cited by examiner

*Primary Examiner* — Duy Khuong T Nguyen

(74) *Attorney, Agent, or Firm* — DLA Piper LLP (US)

(57) ABSTRACT

A processor may receive record data describing at least one interaction between a client and a production environment providing a software service. The processor may receive company dump data describing a context of the production environment during the at least one interaction. The processor may construct at least one simulation of at least one version of the software service including the context. The processor may replay the at least one interaction within the at least one simulation to generate at least one replay result. The processor may identify at least one problem with the at least one version of the software service based on the at least one replay result.

28 Claims, 8 Drawing Sheets

AUTOMATIC PRODUCTION TESTING AND VALIDATION

DETAILED DESCRIPTION OF SEVERAL EMBODIMENTS

Figure 1:
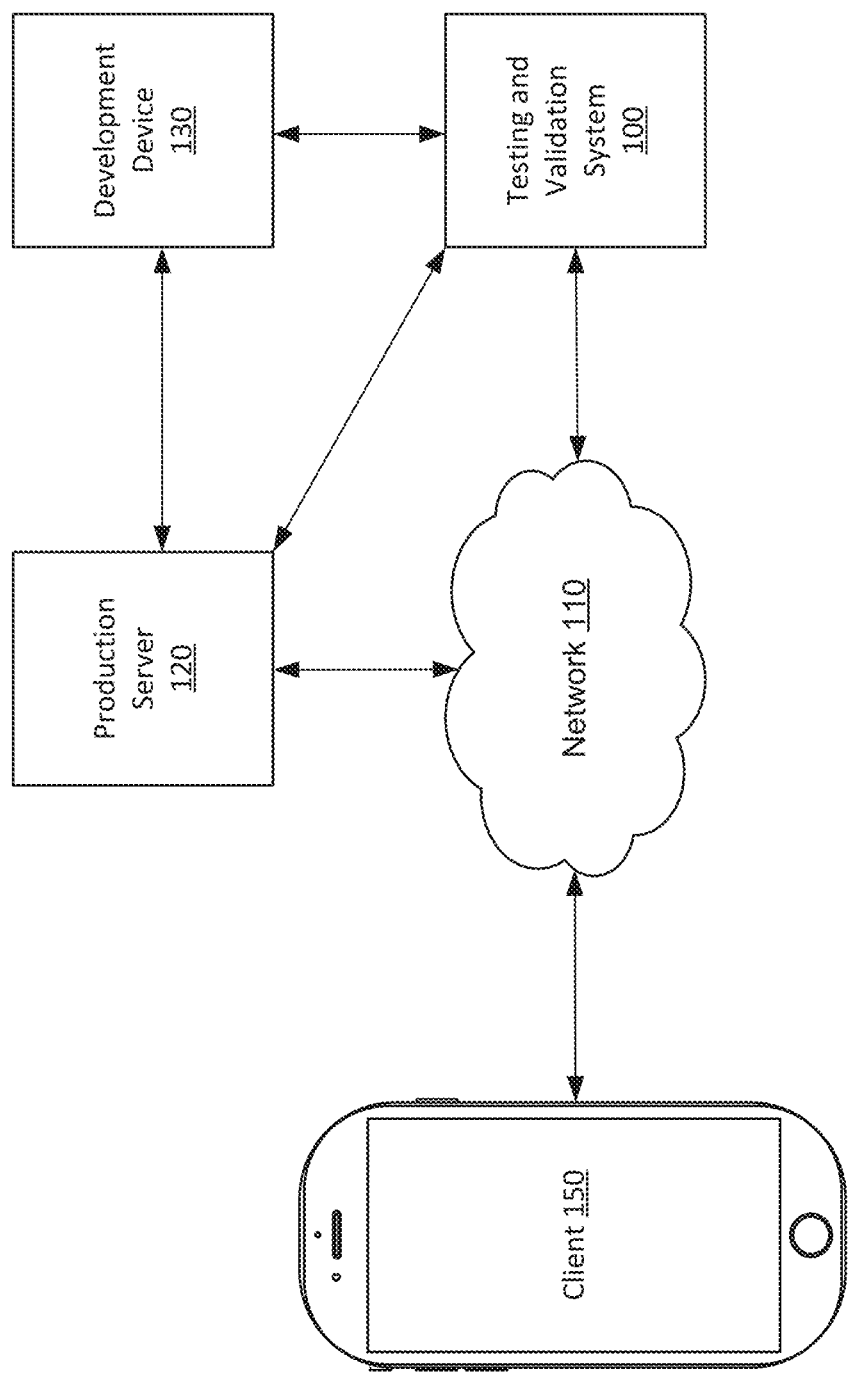
FIG. 1 shows a system configured to perform automatic production testing and validation according to an embodiment of the present disclosure.

Many network-based software systems may include one or more servers that may serve data to one or more clients over the network. For example, clients may communicate with servers using one or more application programming interfaces (APIs). An active computing environment provided by servers for interaction with clients may be a production environment. Software development teams may work in a development environment to update the software provided by the servers, for example to add features and/or fix bugs. The separate development environment may allow the developers to improve the software without impacting active client users in the production environment.

Embodiments disclosed herein may enhance the capabilities of the development environment by allowing real-world production data to be tested against modified code in development. To facilitate this, some embodiments may record user interactions with code deployed in the production environment and information describing a state of the data being manipulated through the user interactions. For example, the recorded user interactions may include records of API calls made from a client device to a server device hosting the production environment or similar interactions, and the information describing the state of the data may include values of numbers and/or fields in the data the user is working with. When the data is gathered, it may be supplied to the development environment, where the state of the data may be replicated using the new code being tested, and the customer interactions may be replayed, but against the new code being tested instead of against the production code. The production environment may identify differences between the old code and the new code based on the simulation, which may include identifying bugs or performance issues in the new code.

The varied and unpredictable nature of client device and/or network hardware and/or software, as well as the varied and unpredictable nature of client user interactions with server-based software products through the network, presents the problem of rendering simulations inadequate for thorough software testing. This is a problem unique to the distributed computing environment. In order to facilitate feature improvement and/or bug fixes, some embodiments disclosed herein may be configured to gather production environment data, automatically test and/or validate the production environment data, and use the results of the testing and/or validation to enhance automatic and/or user-driven features of the production environment. Some embodiments may therefore improve software production by gathering and using real-world (e.g., production environment) interactions with a software product and states of the software product, which may reveal problems and/or other issues that may not be replicable in development environment simulations. Some embodiments may leverage the real-world data to reveal these problems and/or other issues prior to code release, thereby gathering and using the real-world data from users without actually subjecting the users to the problems or otherwise affecting the user experience with the release product.

FIG. 1 shows a testing and validation system 100 configured to perform automatic production validation according to an embodiment of the present disclosure. As described below with respect to FIGS. 2 and 3, system 100 may include one or more hardware and/or software elements configured to perform automatic testing and/or validation of production environment data.

System 100 may be configured to gather data from a production environment. In some embodiments, the production environment may include production server 120, client 150, and/or a combination thereof. Client 150 may be any device configured to provide access to remote applications. For example, client 150 may be a smartphone, personal computer, tablet, laptop computer, or other device. Client 150 may utilize production services provided by production server 120. For example, production server 120 and client 150 may communicate with one another through at least one network 110. Network 110 may be the Internet and/or other public or private networks or combinations thereof. In some embodiments, communication between production server 120 and client 150 may be facilitated by one or more application programming interfaces (APIs). APIs of production server 120 may be proprietary and/or may be examples available to those of ordinary skill in the art such as Amazon® Web Services (AWS) APIs or the like.

As described in detail below, system 100 may be configured to gather data describing interactions between production server 120 and client 150 though network 110, process the data, and provide the processed data to development device 130. Development device 130 may be any device configured to execute development applications. For example, development device 130 may be a personal computer, laptop computer, desktop compute, server, or other device. Development device 130 may be configured to use the processed data to improve aspects of the production environment in future builds of the production environment, for example. In some embodiments, development device 130 and/or another device in communication with development device 130 and/or production server 120 may perform admin functions for one or more aspects of the production environment.

System 100, production server 120, development device 130, and client 150 are each depicted as single devices for ease of illustration, but those of ordinary skill in the art will appreciate that system 100, production server 120, development device 130, and/or client 150 may be embodied in different forms for different implementations. For example, system 100, production server 120, and/or development device 130 may include a plurality of devices. In another example, a plurality of clients 150 may be connected to network 110 and may interact with production server 120. A single user may have multiple clients 150, and/or there may be multiple users each having their own client(s) 150. Furthermore, as noted above, network 110 may be a single network or a combination of networks, which may or may not all use similar communication protocols and/or techniques.

Figure 2:
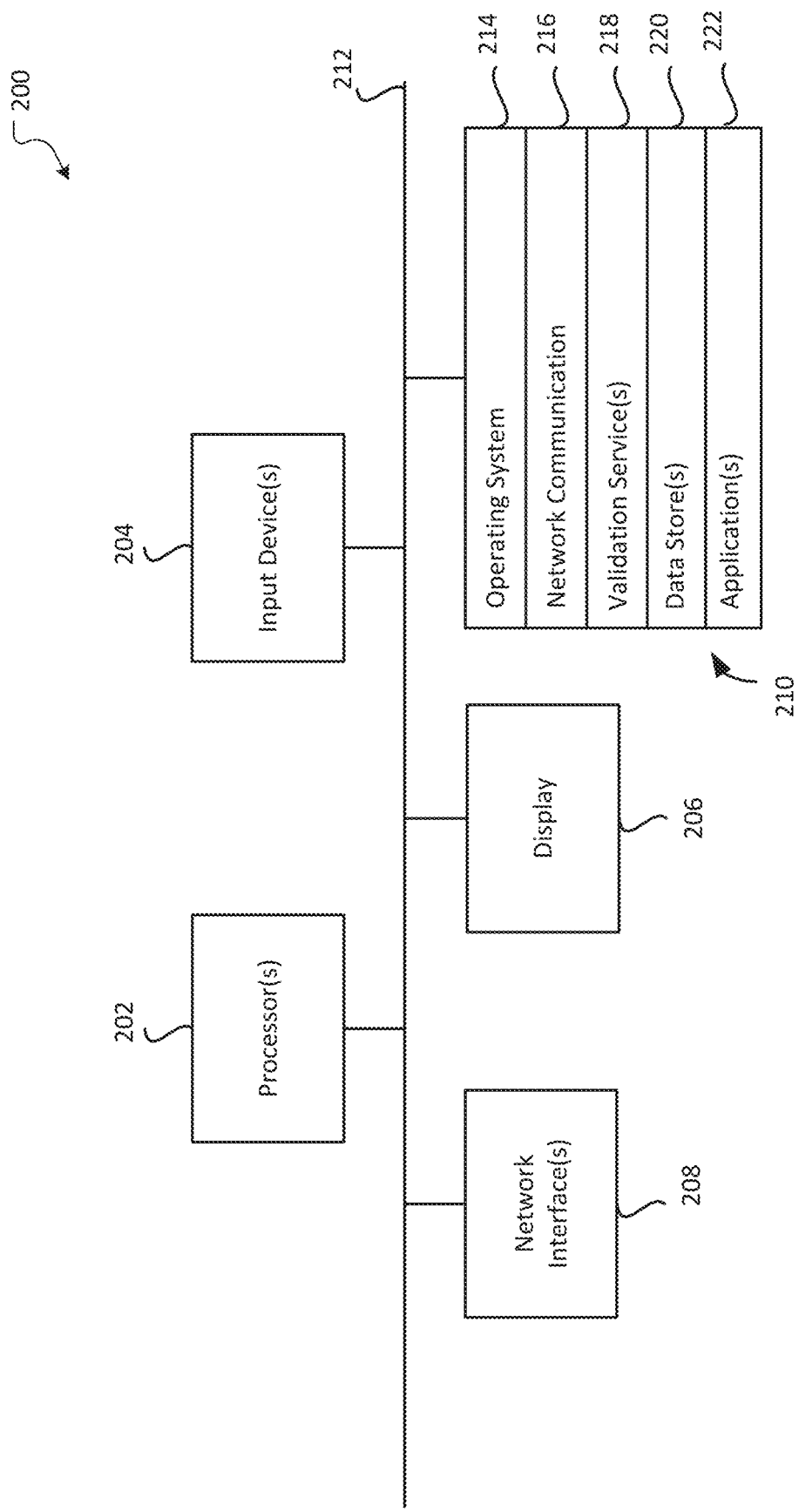
FIG. 2 shows a computing device according to an embodiment of the present disclosure.

FIG. 2 is a block diagram of an example computing device 200 that may implement various features and processes as described herein. Computing device 200 may be implemented on any electronic device that runs software applications derived from instructions, including without limitation personal computers, servers, smart phones, media players, electronic tablets, game consoles, email devices, etc. In some implementations, computing device 200 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Figure 3:
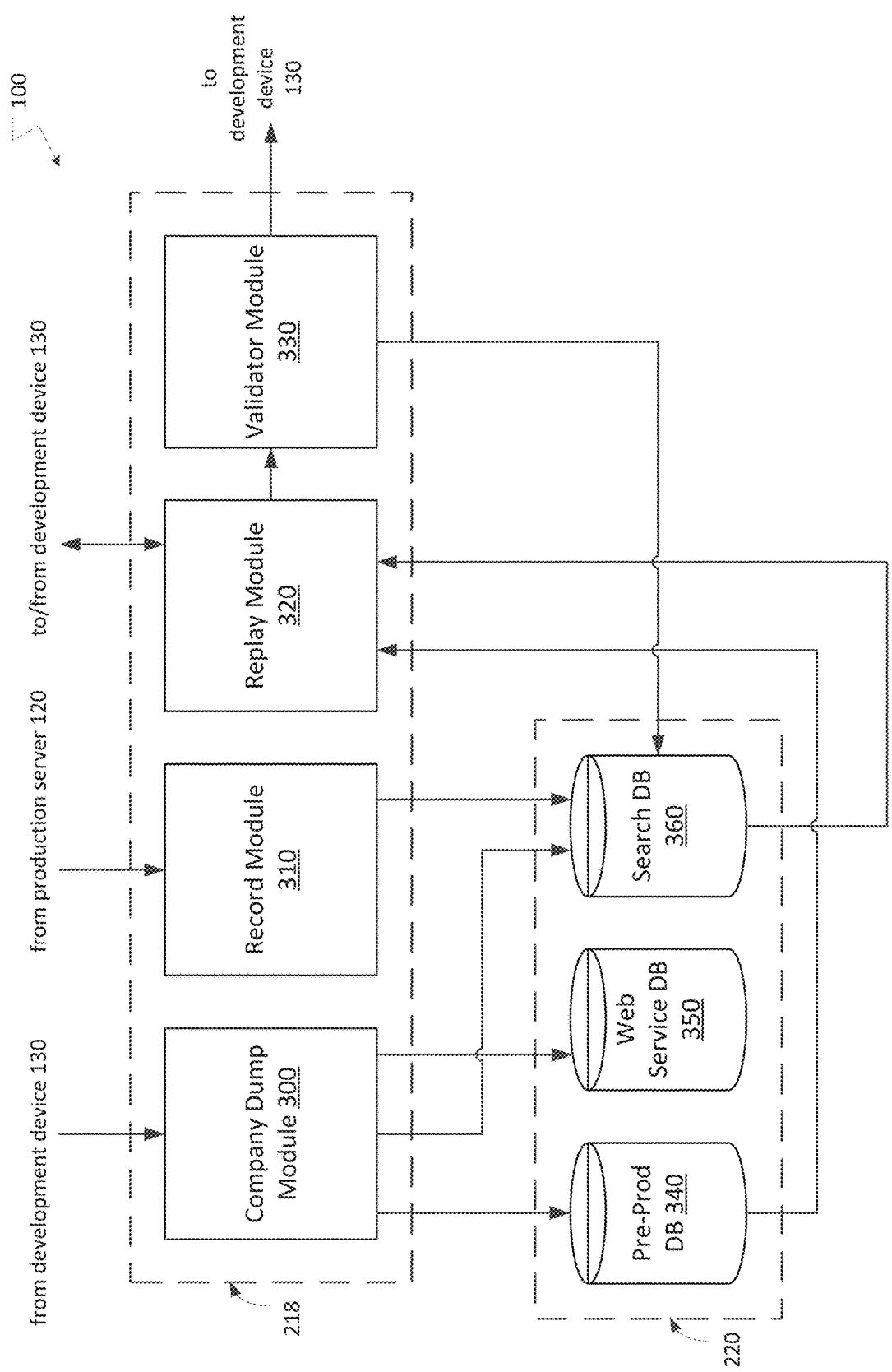
FIG. 3 shows a testing and validation system according to an embodiment of the present disclosure.

Validation service instructions 218 may include instructions that perform the various automatic production testing and/or validation functions described below. In some embodiments, system 100 may include a plurality of computing devices 200, and different computing devices 200 may perform different subsets of the automatic production testing and/or validation functions using different portions of validation service instructions 218. Computer-readable medium 210 may also include one or more data stores 220 that may be used by validation service instructions 218. FIG. 3, described in detail below, provides examples of how validation service instructions 218 and/or data stores 220 may be configured in some embodiments.

Application(s) 222 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

FIG. 3 shows system 100 according to an embodiment of the present disclosure. System 100 may include one or more modules that may be provided by validation instructions 218. System 100 may also include one or more databases that may be part of data store 220. FIG. 3 provides an overview of these modules and/or databases and how they may interact with one another, with detailed examples of processes performed by these elements provided by FIGS. 4-8.

For example, system 100 may include company dump module 300, record module 310, replay module 320, validator module 330, pre-prod database 340, web service database 350, and/or search database 360. The functions of these elements are described in detail with respect to FIGS. 4-8, but may be summarized as follows.

Company dump module 300 may obtain data describing clients 150 and/or accounts associated therewith (e.g., "companies") from development device 130 and/or other admin data source. Company dump module 300 may process the data and/or may store the data and/or processing results in pre-prod database 340, web service database 350, and/or search database 360.

Record module 310 may obtain data associated with client 150 interactions with production server 120 (e.g., remote users of clients 150 consuming services hosted by production server 120) from production server 120. Record module 310 may process the data, store the data and/or processing results in search database 360 and/or report on processing results (e.g., to development device 130).

Replay module 320 may use data from pre-prod database 340 and/or search database 360 to create and/or recreate scenarios based on one or more existing companies and/or interactions within a pre-production environment to evaluate aspects of the services hosted by production server 120 and/or changes thereto (e.g., as defined by data from development device 130).

Validator module 330 may evaluate the results of processing by replay module 320 to identify issues with the services hosted by production server 120 and/or changes thereto. Validator module 330 may store the results of the evaluation and/or may report on the results (e.g., to development device 130).

Figure 4:
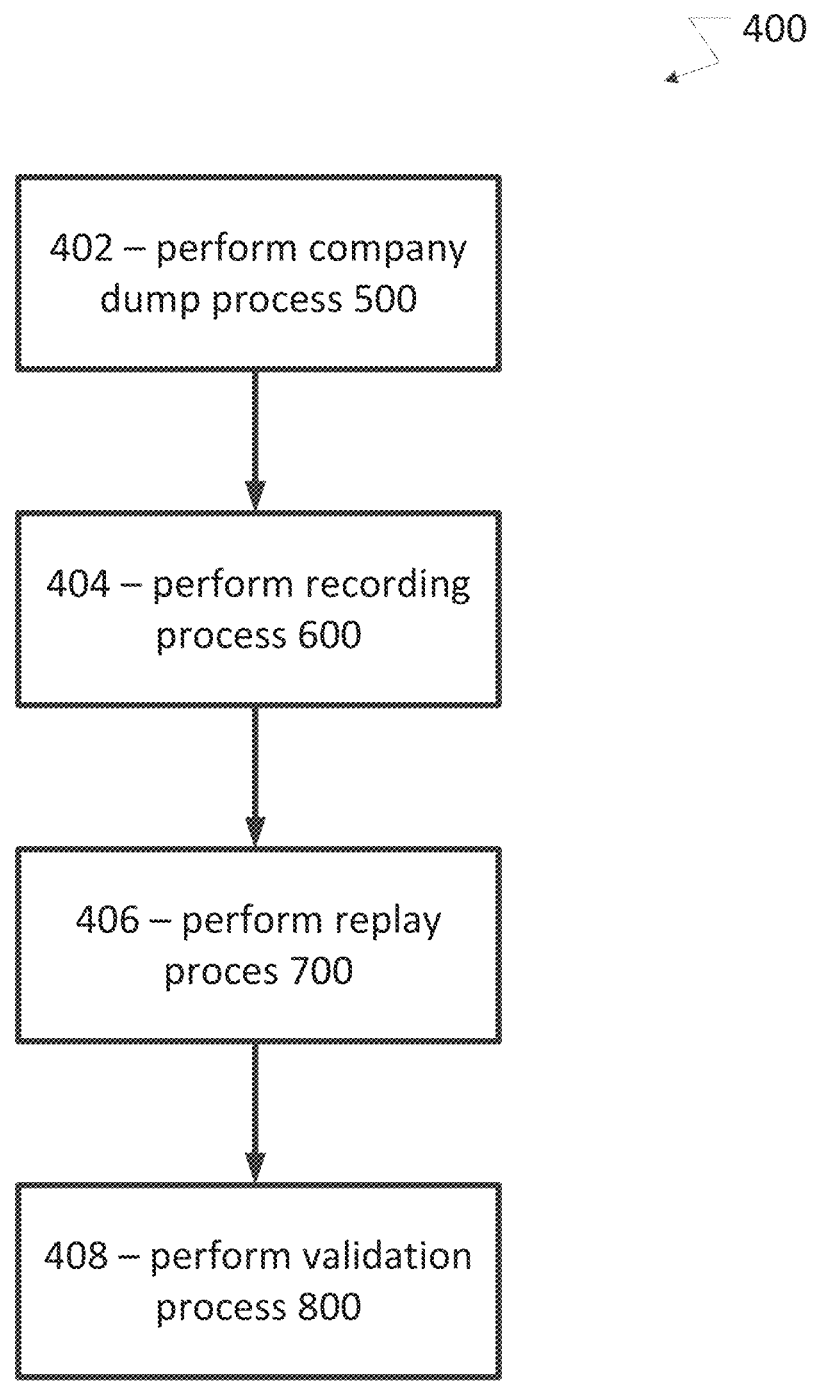
FIG. 4 shows an automatic production testing and validation process according to an embodiment of the present disclosure.

FIG. 4 shows an automatic production testing and validation process 400 according to an embodiment of the present disclosure. System 100 may perform process 400 to gather and/or analyze data generated during interactions between client 150 and production server 120, for example in the context of production environment interactions with a software product. By performing process 400, system 100 may reveal problems and/or other issues with the software product that may not be replicable in development environment simulations.

At 402, system 100 may perform a company dump process. For example, company dump module 300 may perform process 500 as described below. The company dump process may gather data about one or more specific companies (e.g., which may include data about a specific user or group of users). The company dump process may store some or all of the gathered data and/or may process the data to generate additional data for analysis in further steps, as described below. In some embodiments, system 100 may perform the company dump process periodically (e.g., daily).

At 404, system 100 may perform a recording process. For example, record module 310 may perform process 600 as described below. The recording process may gather data about interactions between client 150 and production server 120 (e.g., for user(s) associated with the company data gathered at 402). The recording process may store some or all of the gathered data and/or may process the data to generate additional data for analysis in further steps, as described below. In some embodiments, system 100 may perform the recording process for all interactions between clients 150 associated with some companies and/or for all interactions during a monitored period.

At 406, system 100 may perform a replay process. For example, replay module 320 may perform process 700 as described below. The replay process may use data gathered and/or produced at 402 and/or 404 to simulate changes to the services hosted by production server 120 in a pre-production environment but based on actual user interactions (e.g., from 404).

At 408, system 100 may perform a validation process. For example, validator module 330 may perform process 800 as described below. In some embodiments, the validation process may utilize one or more machine learning processes to validate the outcome of processing at 406 and provide information about issues with the changes to developers, which may allow for those issues to be corrected before the changes are implemented in the production environment.

Figure 5:
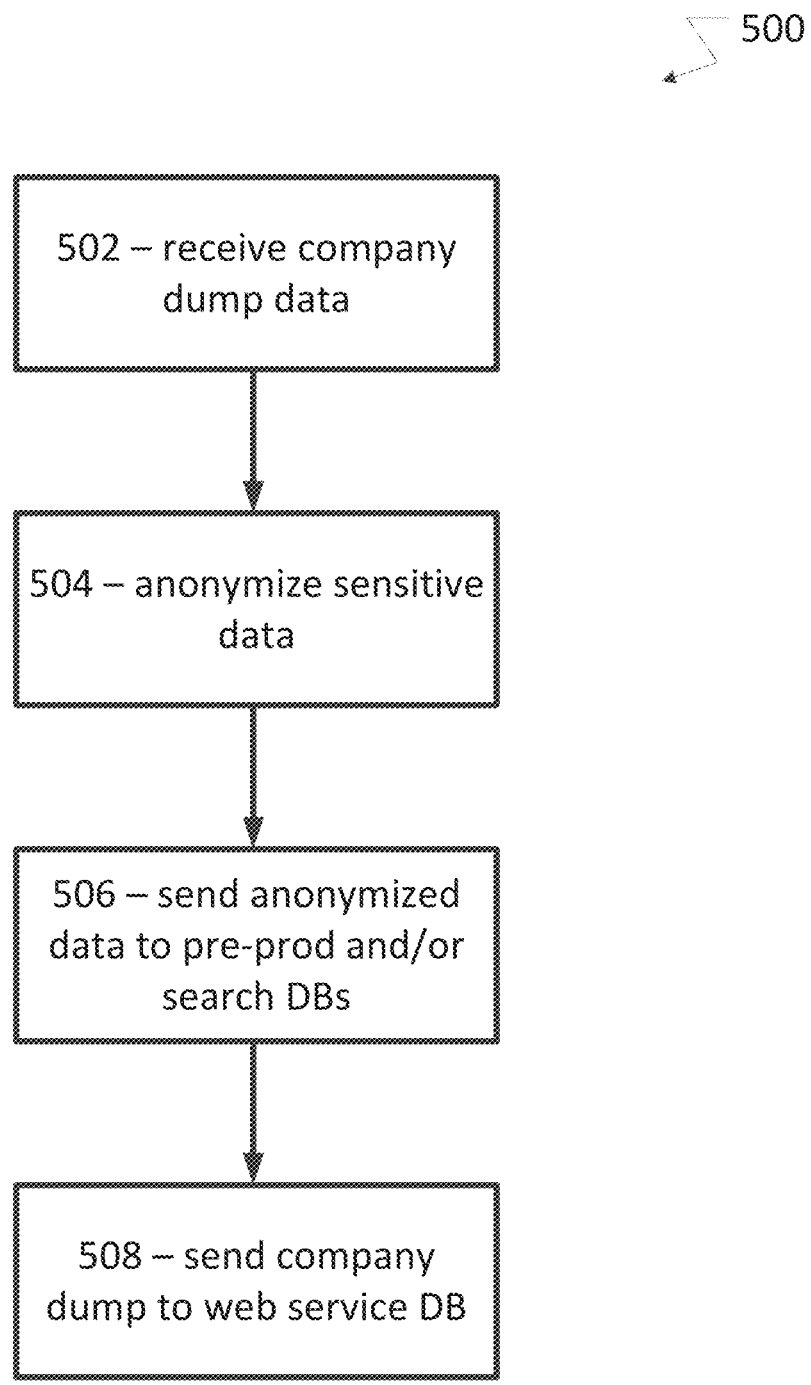
FIG. 5 shows a company dump process according to an embodiment of the present disclosure.

FIG. 5 shows a company dump process 500 according to an embodiment of the present disclosure. In some embodiments, company dump module 300 may perform process 500 as part of a testing and validation process 400 as described above. In some embodiments, company dump module 300 may perform process 500 repeatedly within testing and validation process 400, for example to periodically gather company data as described below.

At 502, company dump module 300 may receive company dump data. For example, in some embodiments, a very large number of clients 150 may use services provided by production server 120 and/or development device 130. In some embodiments, several million users and/or clients 150 may be registered with production server 120 and/or development device 130. Company dump module 300 may designate a subset of companies, or registered accounts for the users and/or clients 150, for data collection. Company dump module 300 may receive data for the subset of companies, for example data describing a state of each company at the time the data is recorded. The data may include user descriptions and/or descriptions of the data entered by the users and/or created by the service. For example, in a financial management service, the data may include company financial information. The data gathered by company dump module 300 may describe a state or context of the software product hosted by production environment 120 at a time during which interactions are recorded (e.g., according to process 600 described below). In some embodiments, company dump module 300 may receive the data periodically, such as once per day or any other period.

At 504, company dump module 300 may anonymize sensitive data included within the company dump data. For example, company dump module 300 may remove data such as user identification information and/or financial information. In some embodiments, company dump module 300 may identify information for removal based on tags for the data or fields in which the data was entered (e.g. "name" tag or field, "social security number" tag or field, etc.). Examples of data that may be anonymized may include, but are not limited to, name, address, employer identification number, social security number, email address, etc. In some embodiments, company dump module 300 may replace removed data with anonymized data of similar quality, for example replacing a text string with a string of random or nonce text of a same character length, or replacing a number with a random or nonce number of a same length.

At 506, company dump module 300 may store the anonymized data from 504 in pre-prod database 340 and/or search database 360. At 508, company dump module 300 may store complete company dump data from 502 in web service database 350. In some embodiments, company dump module 300 may label the stored data in pre-prod database 340, web service database 350, and/or search database 360 so that other processes (e.g., processes 700 and/or 800) may correlate the separately-stored data with a specific company and/or data gathering event. In some embodiments, pre-prod database 340, web service database 350, and/or search database 360 may retain the data stored by company dump module 300 for a specified length of time, such as two weeks or any other length of time.

Figure 6:
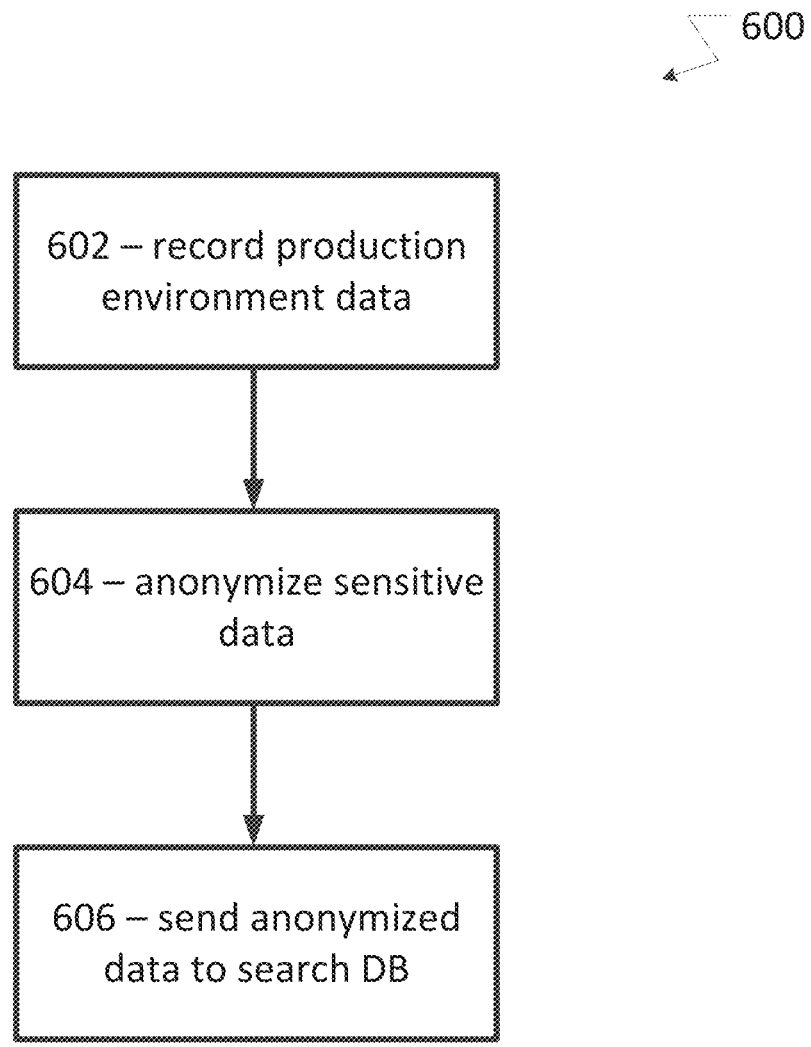
FIG. 6 shows a recording process according to an embodiment of the present disclosure.

FIG. 6 shows a recording process 600 according to an embodiment of the present disclosure. In some embodiments, record module 310 may perform process 600 as part of a testing and validation process 400 as described above. In some embodiments, record module 310 may perform process 600 repeatedly within testing and validation process 400, for example to repeatedly gather interaction data as described below.

At 602, record module 310 may gather production environment data. For example, record module 310 may gather HTML, API, and/or other interactions between clients 150 associated with the subset of companies and production environment 120 (e.g., including HTML or other code executed to process the interactions). For example, interactions may include API calls or similar commands made from client 150 to production server 120. In some embodiments, record module 310 may use GoReplay and/or LogStash (or other tools and/or processes) to record, aggregate, and/or batch the interactions. In some embodiments, record module 310 may gather the production environment data as it is generated for all interactions. In other embodiments, record module 310 may gather the production environment data for a subset of interactions and/or at specific times and not at other times.

At 604, record module 310 may anonymize sensitive data included within the production environment data. For example, record module 310 may remove data such as user identification information and/or financial information. In some embodiments, record module 310 may identify information for removal based on tags for the data or fields in which the data was entered (e.g. "name" tag or field, "social security number" tag or field, etc.). Examples of data that may be anonymized may include, but are not limited to, name, address, employer identification number, social security number, email address, etc. In some embodiments, record module 310 may replace removed data with anonymized data of similar quality, for example replacing a text string with a string of random or nonce text of a same character length, or replacing a number with a random or nonce number of a same length.

At 606, record module 310 may store the anonymized data from 604 in search database 360. In some embodiments, record module 310 may label the stored data in search database 360 so that other processes (e.g., processes 700 and/or 800) may correlate the stored data with a specific company and/or data gathering event. In some embodiments, search database 360 may retain the data stored by record module 310 for a specified length of time, such as two weeks or any other length of time.

Figure 7:
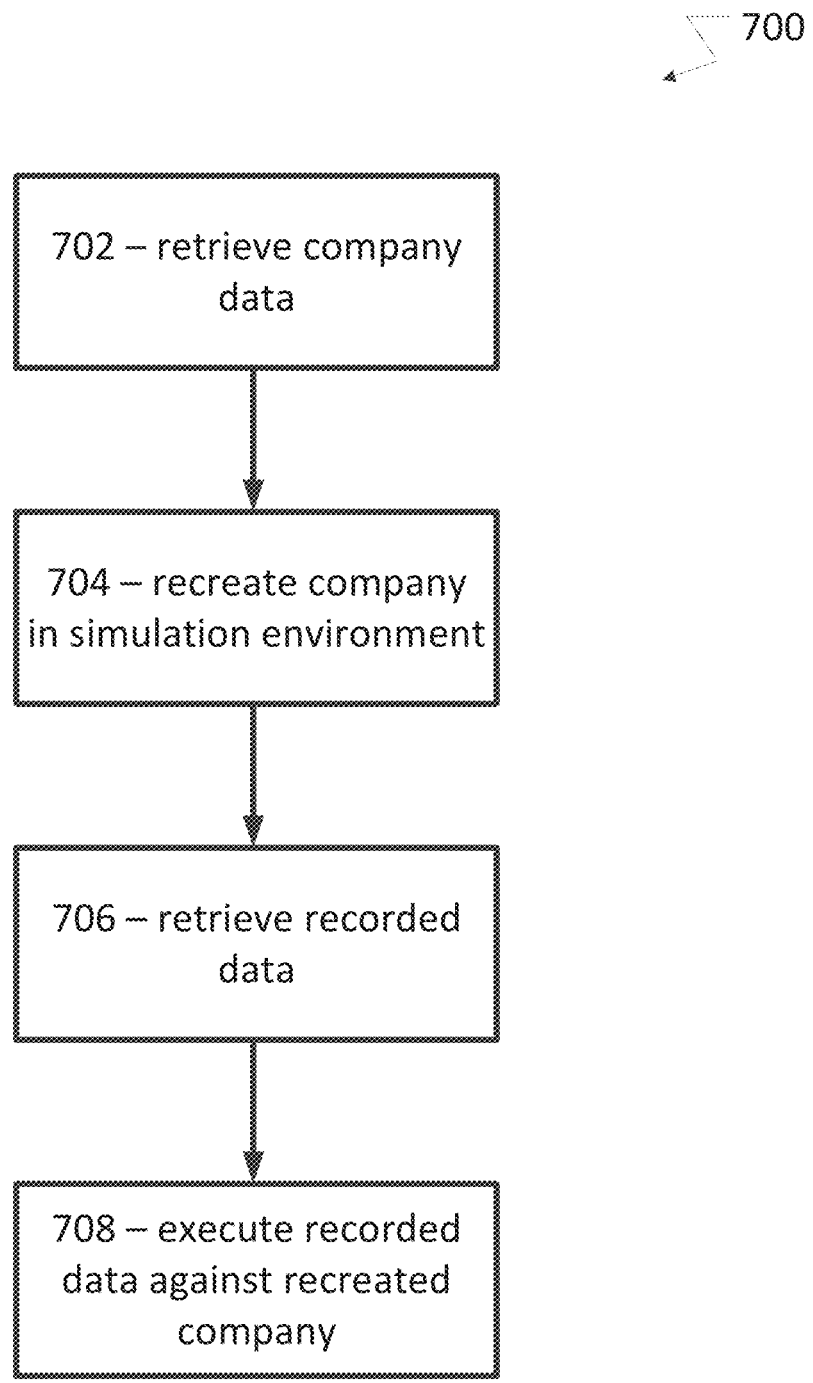
FIG. 7 shows a replay process according to an embodiment of the present disclosure.

FIG. 7 shows a replay process 700 according to an embodiment of the present disclosure. In some embodiments, replay module 320 may perform process 700 as part of a testing and validation process 400 as described above.

At 702, replay module 320 may retrieve company data in order to recreate the company in a pre-production environment. For example, replay module 320 may retrieve anonymized company data stored by company dump module 300 for a company from pre-prod database 340 and/or search database 360.

At 704, replay module 320 may recreate the company for which data was retrieved at 702 within one or more simulation environments. For example, replay module 320 may receive data describing a current product available through production environment 120 (e.g., the product that was used to create the company data gathered by company dump module 300). In some embodiments, replay module 320 may receive the data describing the current product from development device 130, for example. Replay module 320 may recreate the company using the anonymized company data in a simulation of the current product. By using the anonymized company data, replay module 320 may simulate a state of the product under which the user interactions took place.

In another example, replay module 320 may receive data describing a new product including a change and/or update to the current product available through production environment 120 (e.g., a product with at least one difference from the product that was used to create the company data gathered by company dump module 300). In some embodiments, replay module 320 may receive the data describing the new product from development device 130, for example. Replay module 320 may recreate the company using the anonymized company data in a simulation of the new product. By using the anonymized company data, replay module 320 may simulate a state of the product under which the user interactions took place. In some embodiments, replay module 320 may recreate the company in both the current product ("build n") and the new product ("build n+1").

At 706, replay module 320 may retrieve recorded data in order to simulate interactions in the simulated pre-production company environment. For example, replay module 320 may retrieve anonymized interaction data stored by record module 310 for a company from search database 360.

At 708, replay module 320 may execute the recorded data retrieved at 706 against the pre-production company environment(s) created at 704. For example, the interaction data may include API calls made in the course of the real-world interactions (e.g., or other commands issued to the production environment if API calls are not used), as noted above. Replay module 320 may make the same API calls in the same order in the pre-production company environment(s) (e.g., build n and/or build n+1) that have been configured with the anonymized company data, generating output data (e.g., jsons, HTTP status codes, processing results, etc.) that may be analyzed to evaluate the performance of the simulated product(s). For example, as described below, validator module 330 may detect bugs or other errors and/or may evaluate system performance using jmeter or other load and/or performance testing tools and/or processes (e.g., by performing process 800).

Figure 8:
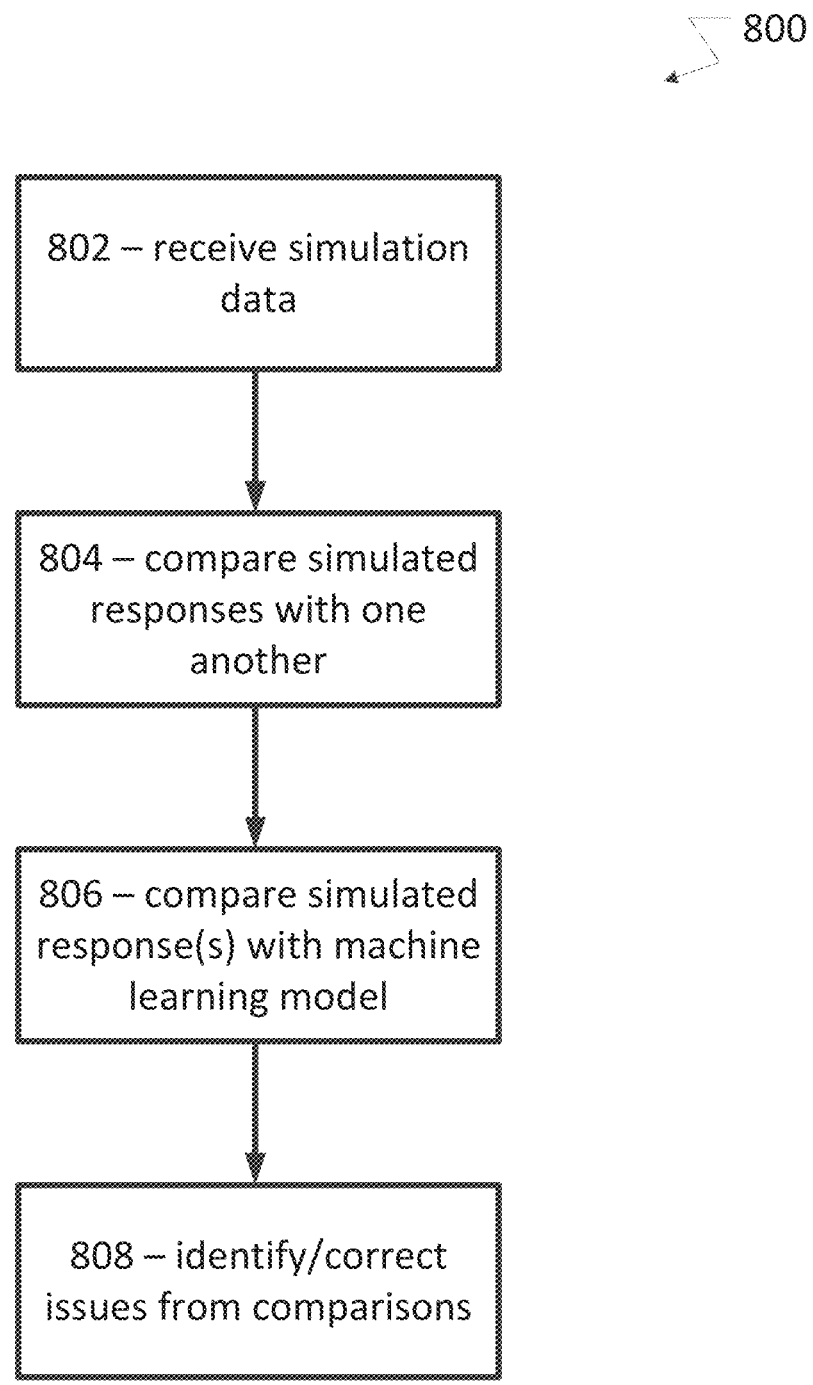
FIG. 8 shows a validation process according to an embodiment of the present disclosure.

FIG. 8 shows a validation process 800 according to an embodiment of the present disclosure. In some embodiments, validator module 330 may perform process 800 as part of a testing and validation process 400 as described above.

At 802, validator module 330 may receive simulation data from replay module 320. For example, validator module 330 may obtain the results of replay module 320 processing at 708 of process 700 as described above.

At 804, validator module 330 may compare the results of multiple simulations with one another. For example, in cases where replay module 320 executes the recorded data against multiple environments, such as build n and build n+1 as described above, validator module 330 may compare the results of each execution. For example, comparing may include comparing HTTP-status codes of different builds, identifying null responses present in one build but not another, comparing array sizes of processing results in respective builds, etc. Validator module 330 may identify differences between the environments based on the comparing. For example, comparing results of the executing may reveal that build n+1 has higher or lower performance than build n for the simulated interaction, and/or the executing may reveal that build n+1 has corrected errors present in build n and/or introduced new errors not present in build n.

At 806, validator module 330 may compare the results of one or more simulations with machine-learning based statistical data. For example, validator module 330 may compare json files and/or other outputs of replay module 320 for a build (e.g., build n+1) with statistical models of json files and/or other outputs of the same build. This comparing may identify aspects of the outputs that may be outside an acceptable range of responses and/or that may not match acceptable responses. For example, a statistical model of the build may define responses to a client 150 request by production environment 120 that are within a range of frequently occurring responses and/or specific responses to a client 150 request by production environment 120 that are identical for a large number of instances. Validator module 330 may identify differences between the executing against build n+1 and the acceptable ranges and/or specific responses.

By comparing with the statistical model, validator module 330 may remove false positives generated at 804. For example, the comparing at 804 may have identified a difference between build n and build n+1 that indicates a slower response by build n+1. However, the slower build n+1 response may still be well within an acceptable range of response times, and may therefore not indicate a problem. Accordingly, validator module 330 may ignore this difference between build n and build n+1 in the identification and/or correction phase (e.g., 808, as described below).

By comparing with the statistical model, validator module 330 may detect issues not identified as differences at 804. For example, the comparing at 804 may have identified no difference between a specific response in build n and build n+1. However, the response may be outside an acceptable range of response times for both builds (e.g., build n may have been released to production environment 120 with a bug). Accordingly, validator module 330 may identify this difference between the statistical model and build n+1 in the identification and/or correction phase (e.g., 808, as described below).

In some embodiments, validator module 330 may build the statistical model (e.g., prior to its use in process 800 in some embodiments). For example, given a set of inputs, a product may produce a set of outputs. Each one or more output may be a separate field. There may be at least two classes to which a given field may belong in some embodiments. For example, a first class may be a "must match" class, where the output must match a given value or be within a given range. A second class may be an "ignore" class, where the output may not matter (e.g., may vary highly each time the product is used). Validator module 330 may use a set of many output instances as training data and may use one or more machine learning algorithms to classify the training data (e.g., a classifier algorithm, a naïve Bayes algorithm, or a combination thereof in some embodiments, although other algorithms may be used such as k-nearest neighbor, random forest, etc.). The machine learning classification may determine probabilities that each field falls into a particular class, thereby providing a model of probabilities indicating which fields may have important outputs that must be correct and which fields may be ignored.

At 808, validator module 330 may identify and/or correct issues detected through comparisons at 804 and/or 806. For example, validator module 330 may generate one or more reports identifying issues detected with one or more builds. Validator module 330 may send report(s) to development device 130 for display to users and/or to implement automatic corrections to code by development device 130. Based on the reporting at 808, developers and/or automatic processes may readily identify specific issues that may result from real-world client 150 and production environment 120 interactions driven by otherwise unpredictable user behavior. As a result, pre-release code (e.g., build n+1) may be optimized for the observed real-world user behavior in addition to being optimized for standard theoretical simulations.

For example, the following scenario may be evaluated in process 800. This scenario is a single example presented to illustrate the functioning of validator module 330 and is not intended to limit the scope of validation process 800. For build n, given input x, the following output may be the correct response:

{
"Date": "18-09-2018"
"Total_amount":"$100"
"discount":"$5"
}

According to a statistical model built from an input of 100 runs, total_amount and discount values may always match, so these two fields may be marked as must match fields. In the same model, date may have varied significantly, so the date field may be marked as an ignore field. Thus, build n+1 may be validated as giving the correct result if it returns the following output:

{
"Date": "21-09-2018"
"Total_amount":"$100"
"discount":"$5"
}

In the above example, the dates are different from build n, but the total_amount and discount fields are correct. In another example, the following output from build n+1 may cause validator module 330 to detect an issue with build n+1:

{
"Date": "21-09-2018"
"Total_amount":"$100"
"discount":"$50"
}

Here, while the date may not matter, and the total_amount may be correct, the discount may be non-matching or outside an acceptable range. Accordingly, build n+1 may include erroneous code that may need to be corrected.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of testing code comprising:
   receiving, at a processor, record data describing at least one interaction between a client and a production environment providing a first version of a software service;
   receiving, at the processor, company dump data describing a context of the production environment during the at least one interaction;
   constructing, by the processor, at least one simulation of at least one version of the software service including the context, the at least one version being different from the first version;
   replaying, by the processor, the at least one interaction within the at least one simulation to generate at least one replay result;
   generating, by the processor, a statistical model of responses by applying a machine learning algorithm to responses observed by the software service, wherein the statistical model defines a first subset of the responses that are required responses and a second subset of the responses that are optional responses;
   identifying, by the processor, at least one problem with the at least one version of the software service by comparing the at least one replay result with the statistical model of responses; and
   sending feedback from the processor to a development device that develops the code, wherein the feedback includes the problem and the feedback is to be implemented to perform automatic corrections to the code.

2. The method of claim 1, wherein the receiving of the record data includes recording data communicated between the client and the production environment.

3. The method of claim 2, wherein the recording includes anonymizing at least a portion of the record data.

4. The method of claim 3, wherein the anonymizing includes replacing a text string having a first character length with a different text string having the first character length.

5. The method of claim 3, wherein the anonymizing includes replacing a number having a first digit count with a different number having the first digit count.

6. The method of claim 1, wherein the receiving of the company dump data includes gathering data describing an account associated with the client and managed within the production environment.

7. The method of claim 6, wherein the recording includes anonymizing at least a portion of the company dump data.

8. The method of claim 7, wherein the anonymizing includes replacing a variable having a first character length with a different variable having the first character length.

9. The method of claim 8, wherein replaying the at least one interaction includes executing at least one instruction having an outcome that is dependent upon the different variable having the first character length.

10. The method of claim 1, wherein the at least one version includes a new build of the software service that is different from a build of the software service hosted by the production environment at a time at which the record data is generated.

11. The method of claim 10, wherein:
    the at least one version includes the build of the software service hosted by the production environment at a time at which the record data is generated; and
    the identifying includes comparing a replay result from the new build of the software service with a replay result from the build of the software service hosted by the production environment at a time at which the record data is generated to identify at least one difference between each replay result indicative of the at least one problem.

12. The method of claim 1, wherein the comparing includes determining that a response in the at least one replay result does not match a corresponding one of the first subset of the responses and-marking the response in the at least one replay result as indicative of the at least one problem.

13. The method of claim 1, wherein the comparing includes determining that a response in the at least one replay result does not match a corresponding one of the second subset of the responses and disregarding the response in the at least one replay result.

14. The method of claim 1, comprising:
    implementing, at the development device, the automatic corrections to the code based on the feedback.

15. A system for testing code comprising:
    a processor configured to:
    receive record data describing at least one interaction between a client and a production environment providing a first version of a software service;
    receive company dump data describing a context of the production environment during the at least one interaction;

construct at least one simulation of at least one version of the software service including the context, the at least one version being different from the first version;

replay the at least one interaction within the at least one simulation to generate at least one replay result;

generate a statistical model of responses by applying a machine learning algorithm to responses observed by the software service, wherein the statistical model defines a first subset of the responses that are required responses and a second subset of the responses that are optional responses;

identify at least one problem with the at least one version of the software service based on the at least one replay result, wherein the identification of the problem includes comparison of the at least one replay result with a statistical model of responses; and send feedback to a development device that develops the code, wherein the feedback includes the problem and the feedback is to be implemented to make automatic corrections to the code.

16. The system of claim 15, wherein the processor is configured to receive the record data by recording data communicated between the client and the production environment.

17. The system of claim 16, wherein the processor is configured to anonymize at least a portion of the record data.

18. The system of claim 17, wherein the processor is configured to anonymize the at least the portion of the record data by replacing a variable having a first character length with a different variable having the first character length.

19. The system of claim 18, wherein the processor is configured to replay the at least one interaction by a process including executing at least one instruction having an outcome that is dependent upon the different variable having the first character length.

20. The system of claim 15, wherein the processor is configured to receive the company dump data by gathering data describing an account associated with the client and managed within the production environment.

21. The system of claim 20, wherein the processor is configured to anonymize at least a portion of the company dump data.

22. The system of claim 21, wherein the processor is configured to anonymize the at least the portion of the company dump data by replacing a text string having a first character length with a different text string having the first character length.

23. The system of claim 21, wherein the processor is configured to anonymize the at least the portion of the company dump data by replacing a number having a first digit count with a different number having the first digit count.

24. The system of claim 15, wherein the at least one version includes a new build of the software service that is different from a build of the software service hosted by the production environment at a time at which the record data is generated.

25. The system of claim 24, wherein:
the at least one version includes the build of the software service hosted by the production environment at a time at which the record data is generated; and
the processor is configured to identify the at least one problem by comparing a replay result from the new build of the software service with a replay result from the build of the software service hosted by the production environment at a time at which the record data is generated to identify at least one difference between each replay result indicative of the at least one problem.

26. The system of claim 15, wherein the comparing includes determining that a response in the at least one replay result does not match a corresponding one of the first subset of the responses and marking the response in the at least one replay result as indicative of the at least one problem.

27. The system of claim 15, wherein the comparing includes determining that a response in the at least one replay result does not match a corresponding one of the second subset of the responses and disregarding the response in the at least one replay result.

28. The system of claim 15, wherein the development device is configured to implement the automatic corrections to the code based on the feedback.

* * * * *